(12) United States Patent
Frank et al.

(10) Patent No.: US 9,065,836 B1
(45) Date of Patent: Jun. 23, 2015

(54) FACILITATING ROLE-BASED SHARING OF CONTENT SEGMENTS

(75) Inventors: Stefan Frank, Belmont, MA (US); Rani Manoharan, Cambridge, MA (US)

(73) Assignee: Google Inc., Mountain View, CA (US)

( * ) Notice: Subject to any disclaimer, the term of this patent is extended or adjusted under 35 U.S.C. 154(b) by 200 days.

(21) Appl. No.: 13/526,386

(22) Filed: Jun. 18, 2012

(51) Int. Cl.
*H04L 29/06* (2006.01)

(52) U.S. Cl.
CPC .................. *H04L 63/104* (2013.01)

(58) Field of Classification Search
CPC ............. G06Q 50/01; H04L 29/06823; H04L 29/06829; H04L 29/06843; H04L 63/10; H04L 63/101; H04L 63/104; H04L 63/105
USPC .................... 709/204–206, 225–226; 705/319
See application file for complete search history.

(56) References Cited

U.S. PATENT DOCUMENTS

| | | | | |
|---|---|---|---|---|
| 5,941,947 | A * | 8/1999 | Brown et al. .................. | 709/225 |
| 6,292,904 | B1 * | 9/2001 | Broomhall et al. ................ | 714/1 |
| 6,493,749 | B2 * | 12/2002 | Paxhia et al. ................... | 709/220 |
| 6,567,849 | B2 * | 5/2003 | Ludovici et al. .............. | 709/223 |
| 7,620,976 | B2 * | 11/2009 | Low et al. .......................... | 726/4 |
| 7,627,569 | B2 * | 12/2009 | Gafter .................................. | 1/1 |
| 8,234,278 | B2 * | 7/2012 | Yoshimura et al. ............ | 707/736 |
| 8,407,805 | B2 * | 3/2013 | Warrington et al. ............ | 726/27 |
| 8,484,227 | B2 * | 7/2013 | Svendsen ....................... | 707/752 |
| 8,484,746 | B2 * | 7/2013 | Bhide et al. ..................... | 726/28 |
| 8,484,747 | B2 * | 7/2013 | Bhide et al. ..................... | 726/28 |
| 2002/0169779 | A1 * | 11/2002 | Tseng et al. ................... | 707/100 |
| 2003/0107591 | A1 * | 6/2003 | Jameson ........................ | 345/744 |
| 2003/0191709 | A1 * | 10/2003 | Elston et al. ..................... | 705/40 |
| 2005/0283470 | A1 * | 12/2005 | Kuntzman et al. ................ | 707/4 |
| 2006/0184794 | A1 * | 8/2006 | Desselle et al. ................ | 713/166 |
| 2008/0005115 | A1 * | 1/2008 | Corley et al. ...................... | 707/9 |
| 2009/0199302 | A1 * | 8/2009 | So et al. ........................... | 726/27 |
| 2009/0313079 | A1 * | 12/2009 | Wahl ................................. | 705/9 |
| 2010/0217880 | A1 * | 8/2010 | Venezia et al. ................ | 709/229 |
| 2013/0311658 | A1 * | 11/2013 | Solomon et al. .............. | 709/225 |

* cited by examiner

*Primary Examiner* — Lance L Barry
(74) *Attorney, Agent, or Firm* — McDermott Will & Emery LLP

(57) ABSTRACT

In one aspect a machine-implemented method is provided including receiving a request from a user to share content associated with the user with a second user, the content belonging to a specific content space, wherein content belonging to the content space is categorized into two or more content categories by the system, providing a set of system-defined roles associated with the content space to the user for selection, each role being pre-associated with one or more rules defining which of the two or more content categories are accessible by user associated with the role, receiving a selection by the user of a role of the plurality of system-defined roles provided to the user to assign to the second user, associating the role with the second user in response to receiving the selection and providing the second user with access to the content according to the one or more pre-associated rules.

21 Claims, 5 Drawing Sheets

FACILITATING ROLE-BASED SHARING OF CONTENT SEGMENTS

BACKGROUND

The subject disclosure generally relates to sharing content, and, in particular, to sharing portions of content with other users.

Users may create associations with one another over a network, e.g., a social network on the internet. Such user associations may be defined on a user-to-user basis, or as a group of users associated through membership within a group. Users can use various collaborative online tools to share content with their contacts.

SUMMARY

The disclosed subject matter relates to a machine-implemented method including receiving a request from a user to share content associated with the user with a second user, the content belonging to a specific content space, where content belonging to the content space is categorized into two or more content categories by the system. The method further includes providing a set of system-defined roles associated with the content space to the user for selection, each role being pre-associated with one or more rules defining which of the two or more content categories are accessible by user associated with the role. The system further includes receiving a selection by the user of a role of the plurality of system-defined roles provided to the user to assign to the second user. The system further includes associating the role with the second user in response to receiving the selection and providing the second user with access to the content according to the one or more pre-associated rules.

These and other aspects can include one or more of the following features. The content may include trip information regarding a trip. The two or more categories may include an infrastructural trip information category, an experience trip information category and a location information category. The plurality of system-defined roles may include detailed planner, family member, trip companion, follower and past trips user.

Users assigned to each of the plurality of system-defined roles have different access to a different segment of the content than users assigned to at least another one of the plurality of system-defined roles. The one or more rules may be system-defined and may be automatically applied to the access rights of a user associated with the role with respect to the content. At least one of the one or more pre-associated rules may be further associated with one or more sub-rules, a sub-rule defining one or both of access rights and context limitations with respect to content within the content space.

The access rights may define whether the user has one or more both of rights to view content that the user has access to according to the rule or edit content. The context limitations may define one or more of a time of day, a date range, a location or a device where the user can access content.

The method may further include determining whether the user has entered one or more user-defined rules, the additional rules not being pre-associated with the role and associating the user-defined rules with the second user, where the user-defined rules provide further limitations on the access rights of the second user according to the one or more pre-associated rules.

The method may also include receiving an indication of a request from the second user to access the content, determining the role associated with the second user in response to receiving the indication, determining one or more system-defined rules associated with the role and providing the second user with access to the content according to the determined one or more system-defined rules.

The method may further include determining one or more user-defined rules associated with the second user, wherein the providing the second user with access is further based on the one or more additional user-defined rules. The second user may be associated with one or more different roles of the plurality of system-defined roles for different content belonging to the content space.

The categorization of the content within the content space may be based on one or more of the characteristics of content within the content space and historical information regarding content belonging to the content space. The one or more rules for each of the plurality of system-defined roles may be defined according to one or more of the type of relationship defined by the role, the characteristics of content within the content space and historical information regarding the content belonging to the content space.

The disclosed subject matter further relates to a system including one or more processors and a machine-readable medium comprising instructions stored therein, which when executed by the processors, cause the processors to perform operations including receiving a request to share a first content associated with a user with a second user, the content belonging to a content space, where content belonging to the content space is categorized into two or more content categories, the request including a selection by the user of a role of a plurality of system-defined roles associated with the content space to assign to the second user. The operations further include associating the selected role with the second user in response to receiving the selection, the selected role being associated with one or more rules pre-associated with the role by the system, where the one or more rules define whether content under each of the two or more categories is shared with users assigned to the role and sharing the first content with the second user according to the selected role associated with the second user.

These and other aspects can include one or more of the following features. The operations may further include receiving a selection of one or more additional user-defined rules by the user, the additional user-defined rules defining further limitations on the access rights of the second user and associating the additional user-defined rules with the second user, such that the access of the second user to the content is further limited based on the one or more additional user-defined rules.

The second user may be associated with one or more different roles of the plurality of system-defined roles for different content belonging to the content space. The categorization of the content within the content space may be based on one or more of the characteristics of content within the content space and historical information regarding content belonging to the content space. The one or more rules for each of the plurality of system-defined roles may be defined according to one or both of the type of relationship defined by the role, the characteristics of content within the content space and historical information regarding the content belonging to the content space.

The disclosed subject matter also relates to a machine-readable medium comprising instructions stored therein, which when executed by a machine, cause the machine to perform operations including receiving a request to share content associated with a user with a second user, the content belonging to a content space, content within the content space being categorized into two or more content categories, receiving a selection by the user of a role of a plurality of system-defined roles associated with the content space to assign to the second user, each of the plurality of system-defined roles being pre-associated with one or more rules, wherein the one or more rules define which of the two or more content categories are accessible by users associated with the role. The operations further including associating the role with the second user in response to receiving the selection and providing the second user with access to the content, wherein the second user is granted access to the content according to the one or more rules.

These and other aspects may provide one or more of the following advantages. A method and system are provided for facilitating collaboration and sharing of content in a manner that provides balance between privacy and the benefits of information sharing. A user is able to easily share selective information that is pertinent according to the nature of the user's association with specific contacts by assigning a role to the contact. Thus, the user is able to apply custom rights when sharing content which each user without needing to specify individual settings each time the user wishes to share content with a contact.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
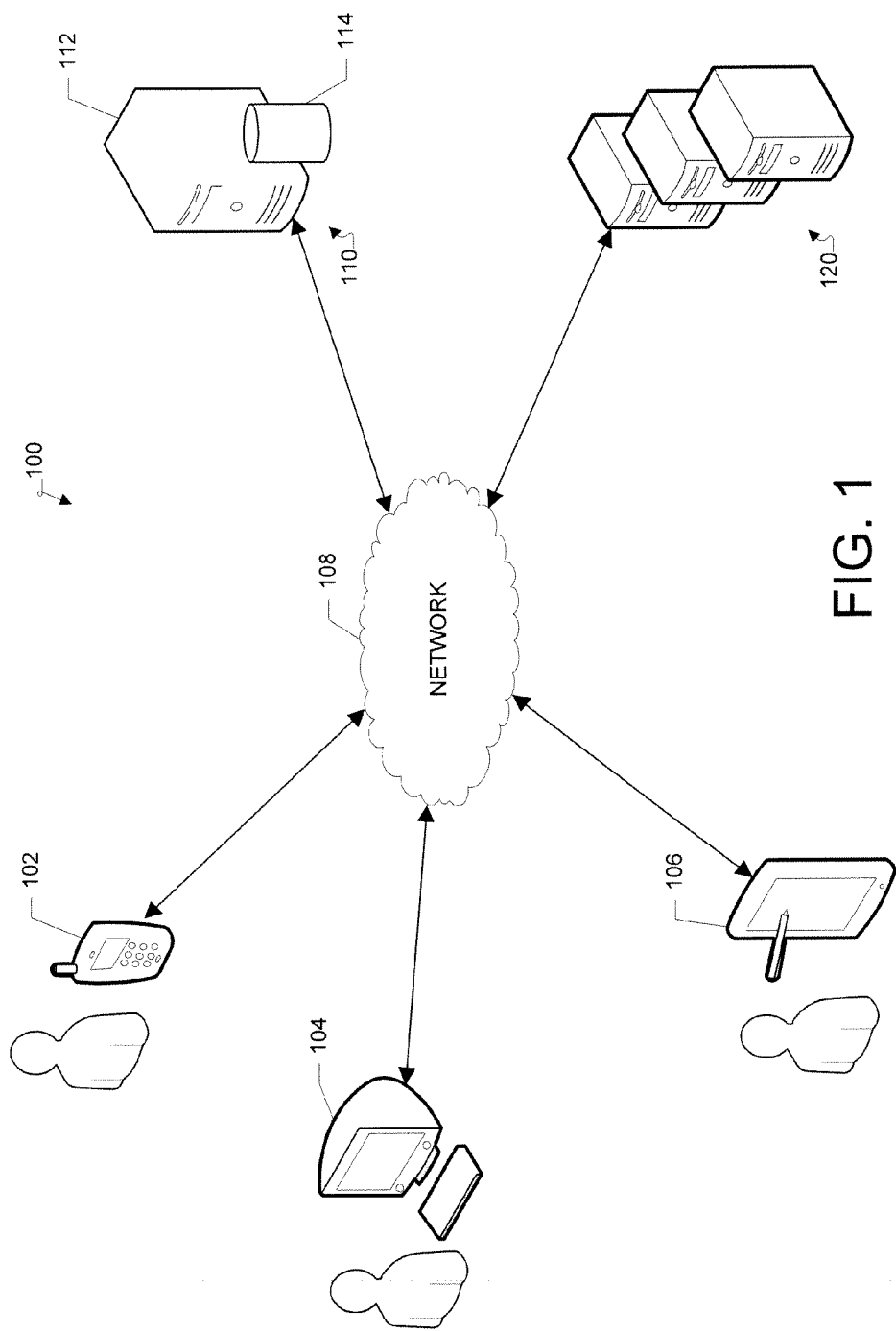
FIG. 1 illustrates an example client-server network environment, which provides for managing sharing of content with contacts of a user.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

The subject disclosure provides a method and system for facilitating categorized sharing levels for sharing content with contacts, where the sharing levels reflect roles for those with whom such content is shared. As one example, a user can share trip information (e.g., travel itinerary and detail information) regarding a given trip with one or more contacts according to a classification of each contact into a specific role.

Each role is defined by a set of sharing rules indicating which information is shared with contacts being assigned to the role, as well as sub-rules more specifically defining the manner that such information is shared with those contacts assigned to the role. Content shared with one or more contacts may be grouped into different categories. For example, trip information may be classified into categories including infrastructural information (e.g., flights, transportation, hotels), experience information (photos, check-ins, comments), and location information (the actual location of the user throughout the trip).

The rules for each role may define whether each category is shared with the contacts assigned to the role. Furthermore, within each category of information (e.g., for each rule), sub-rules may define restrictions on sharing of the information within the category (e.g., the manner in which the content is shared). For example, for a role, the location of the traveler may be displayed at all times, while for another role the location information of the traveler may be shown only within certain times of the day (e.g., business hours). Each role may further be broken into sub-roles defined by a set of rules and sub-rules. For example, the trip companion role may include a sub-role for a trip companion (business): a business colleague traveling with the user, and trip companion (family): a family member traveling with the user.

The rules for each role and/or sub-role may be defined by the system based on the semantic definition of the relationship defined by the role and the type of content that is likely to be of interest and/or use to the role based on the nature of the relationship. That is, each role defines a subset of contacts based on the nature of the relationship of that contact with the owner of the content, and the rules define the type of content that are likely to be of interest and/or use to the contact based on the nature of the relationship.

Additionally, the one or more rules for each of the plurality of system-defined roles and/or sub-roles may be defined based on the characteristics of content within the content space and historical information regarding the content belonging to the content space. Roles and/or sub-roles may be defined based on the internal heuristics of the content space. Historical information regarding the content space may be used to determine specific roles that are typical for contacts with which content within the content space is typically shared. Furthermore, the historical information may be used by the system to determine the types of content that should be visible to each role and/or sub-role, thus providing information regarding the rules that the system provides for each role and/or sub-role. Similarly, content characteristics may be used to determine the rules for each of the roles and/or sub-roles.

Rules for sharing different categories of information may be pre-defined (e.g., by the user, system developer, and/or user in a supervisory role) for each unique role. For each role, there may further be an option to define one or more additional rules and/or sub-rules (e.g., by the user, system developer and/or a user in an advisory role) or select pre-defined options provided as additional rules and/or sub-rules with respect to the contact. The pre-defined rules, as described above, are defined based on the nature of the relationship of the contact assigned to the role and the owner of the content. More specifically, the type of content that is shared with each contact is pre-defined by the system based on the general definition of the type of relationship that the trip planner, i.e., content owner, holds with the contact assigned to the role.

For example, with respect to sharing travel information, the basic roles for classifying contacts subject to some form of sharing may include "detailed planner", "family member (non-companion)", "trip companion", "follower" and "past trips user".

The detailed planner role may be defined with rules providing contacts associated with the role (e.g., an assistant) with full access to all details of the trip (e.g., read and write access) to help planning parts of the trip, as well as the traveler's full itinerary (infrastructural information), and location information. The family member role may be associated with rules providing contacts associated with the role (e.g., a spouse) with full access to all details of the trip including the traveler's full itinerary (infrastructural information), and location information. The family member may only have read access to the trip using the collaboration tool. A trip companion may have limited read access to relevant information, including for example the location and the status of the companion when in transit and on travel. The follower role (e.g., a contact that is casually interested in the traveler's trip) may have access to experience information including check-ins, visits, reviews and photos. The last role, user of past trips, covers contacts that plan a similar trip and receive the whole trip information as a template/example of a trip. The information shared with contacts assigned to this role may be similar to the follower role, with the variance that it may allow copying the travel itinerary.

Thus, the user is able to assign roles (or sub-roles) to contacts when sharing content with those contacts. The roles are pre-defined by the system, rather than the content-owner, and provide a fixed scope of content that may be shared with contacts based on the semantic definition of the content space and the relationships that are common between content owners and their contacts within the specific content space. The contacts are then provided with content according to the rules and sub-rules associated with the role and/or sub-role. The assignment of a role to a user is specific to the content, and the same user may be assigned to different roles by the same content owner, and/or other content owners, with respect to different collection of content.

Contacts can include other users that a user is associated with over the internet using one or more services including for example over electronic messaging, or at one or more social networking services. For example purposes, the subject disclosure is described with respect to trip information, however, it should be understood that other types of content may be shared in the manner described throughout.

FIG. 1 illustrates an example client-server network environment, which provides for managing sharing of content with contacts of a user. A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In some implementations, server 110 includes a processing device 112 and a data store 114. Processing device 112 executes computer instructions stored in data store 114, for example, to facilitate sharing content according to role-based sharing levels among users interacting with electronic devices 102, 104, 106. Server 110 may further be in communication with remote servers 120 either through the network 108 or through another network or communication means.

According to some aspects, remote servers 120 can be any system or device having a processor, a memory and communications capability for hosting various trip planning services, content management services, email services and/or remote social networking services. Remote servers 120 may be further capable of maintaining social graphs of users and their contacts. The remote social networking services hosted on the remote server 120 may enable users to create a profile and associate themselves with other users at a remote social networking service. The remote servers 120 may further facilitate the generation and maintenance of a social graph including the user created associations. The social graphs may include, for example, a list of all users of the remote social networking service and their associations with other users of a remote social networking service. The remote servers 120 may further host one or more content management services, databases and/or repositories for maintaining various content which may be authored and/or created by one or more users and shared with contacts of the user (e.g., a trip planning service).

In some example aspects, server 110 and/or one or more remote servers 120 can be a single computing device such as a computer server. In other implementations, server 110 and/ or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through the HTTP communication protocol. Other communication protocols may also be facilitated including for example, XMPP communication, for some or all communications between the client devices 102, 104, 106, server 110 and one or more remote servers 120 (e.g., through network 108).

Users may interact with the system hosted by server 110, and/or one or more services hosted by remote servers 120, through a client application installed at the electronic devices 102, 104, 106. Alternatively, the user may interact with the system and the one or more remote services through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

A user interacting with a client device (e.g., electronic devices 102, 104 and 106), may access the system (e.g., hosted at server 110), for example through a client application at his/her client device, and request to share trip information content (e.g., trip information from a trip planning service hosted at server 120) with one or more of his/her contacts. For example, the user may access a trip planning service application hosted at one or more remote servers 120 and may create a trip including various aspects and may select to share trip information regarding a trip with a contact. The system may detect the user request to share the trip information and may generate and provide a graphical user interface for display at the user's client device (e.g., electronic devices 102, 104 and 106). The user may then select the content, and further select the contact for sharing the information. Upon selecting the contact, the user may assign a specific role to the selected contact (e.g., upon being prompted by the client application). The roles assignable to a contact are pre-defined by the system for selection by the user, previous to the user selecting to share the content with the specific contact. The roles are defined based on the content space and the type and nature of relationships that are common with respect to the content space. Thus, the roles, which are defined by the system (e.g., rather than the content owners) are defined based on the special characteristics of the type of content to be shared and the characteristics of the users that are typical receiving the content.

Each role is associated with a set of rules and/or sub-rules. In addition, upon selecting the role, the user may further select to assign a sub-role to the contact, the sub-role being associated with a set of rules and/or sub-rules. In one example, the sub-roles are also pre-defined by the system and define a sub-set of a relationship defined with respect to the content. Once the user has selected the role/sub-role, the user may further customized the scope of content shared and/or the manner that the content is shared with a specific role and/or contact by selecting and/or inputting one or more additional rules and/or sub-rules. The additional rules and/or sub-rules are associated with the role and/or the specific contact. The system may then generate a notification, notifying the contact that the user has shared trip information with him/her and provide the notification to the contact. The contact may then select to view the shared trip information.

Upon receiving a request from the contact to access the trip information. The system determines the role and/or sub-role assigned to the contact. The system further determines rules and sub-rules associated with the role and/or sub-role. The system then grants access to trip information to the contact according to the rules and/or sub-rules.

Figure 2:
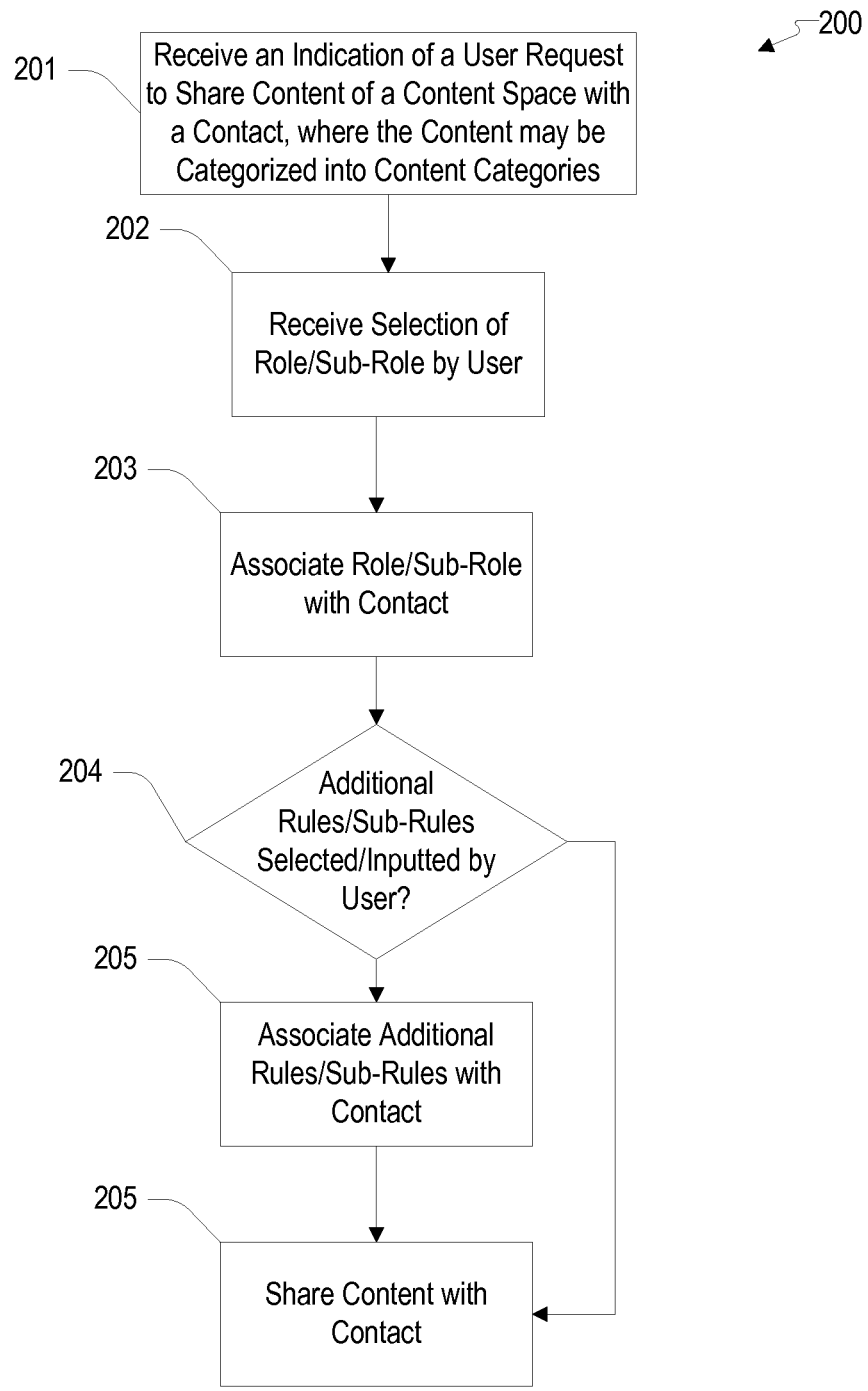
FIG. 2 illustrates a flow diagram of an example process for facilitating role-based information sharing with contacts of a user.

FIG. 2 illustrates a flow diagram of an example process 200 for facilitating role-based information sharing with contacts of a user. In step 201, the system receives an indication of a request from a user to share content with a contact, the content belonging to a specific content space. For example, the content space may include travel information, and the content may include content relating to a specific trip. In step 202, the system receives a selection of role to associate with the contact. For example, upon receiving the indication of the request in step 201, the system may determine the type of content being shared and may determine a set of roles corresponding to the content. In one example, the content space may be grouped into various categories. The roles corresponding to the content space may be pre-defined by the system and may include a set of rules which define which categories or segments of the content may be shared with contacts assigned to each specific role. There may be a set of roles corresponding to the content space including pre-defined rules and/or sub-rules. Upon receiving the user request, the system may retrieve roles associated with the content space that the content belong to and present the roles for selection to the user.

For example, a user may select to share trip information regarding a specific trip (e.g., various itinerary information and trip details) with a contact. The pre-defined roles for classifying contacts subject to some form of sharing may include "detailed planner", "family member (non-companion)", "trip companion", "follower" and "past trips user". The trip information may be classified into categories including infrastructural information (e.g., flights, transportation, hotels), experience information (photos, check-ins, comments), and location information (the actual location of the user throughout the trip).

Content may be categorized into categories automatically by the system based on pre-defined criteria (e.g., content type, size, identification, source, etc.) and/or may be assigned to a category according to user input. In one example, content is categorized by the system based on the inherent characteristics of the content and the content space. In one example, the content may be categorized based on the internal heuristics of the content space. For example, historical information regarding the content and content space, such as user interactions with content, and types of content generally requested by or viewed by users, or shared with users may be used to defined content categories.

Each role may be pre-associated with a set of rules and/or sub-rules that define whether content classified under each category is shared with the contacts assigned to the role. Each role may further be broken into sub-roles defined by a set of pre-defined rules and/or sub-rules. The one or more rules for each of the plurality of system-defined roles and/or sub-roles may be defined according to one or more of the type of relationship defined by the role, the characteristics of content within the content space and historical information regarding the content belonging to the content space. Roles and/or sub-roles may be defined based on the internal heuristics of the content space. Historical information regarding the content space may be used to determine specific roles that are typical for contacts with which content within the content space is typically shared. Furthermore, the historical information may be used by the system to determine the types of content that should be visible to each role and/or sub-role, thus providing information regarding the rules that the system provides for each role and/or sub-role. Similarly, content characteristics may be used to determine the rules for each of the roles and/or sub-roles.

For example, the trip companion role may include a sub-role for a trip companion (business): a business colleague traveling with the user, and trip companion (family): a family member traveling with the user.

The detailed planner role may be defined with rules providing contacts associated with the role (e.g., an assistant) with full access to all details of the trip (e.g., read and write access) to help planning parts of the trip, as well as the traveler's full itinerary (infrastructural information), and location information. The family member role may be associated with rules providing contacts associated with the role (e.g., a spouse) with full access to all details of the trip including the traveler's full itinerary (infrastructural information), and location information. The family member may only have read access to the trip using the collaboration tool. A trip companion may have limited read access to relevant information, including for example the location and the status of the companion when in transit and on travel. The follower role (e.g., a contact that is casually interested in the traveler's trip) may have access to experience information including check-ins, visits, reviews and photos. The last role, user of past trips, covers contacts that plan a similar trip and receive the whole trip information as a template/example of a trip. The information shared with contacts assigned to this role may be similar to the follower role, with the variance that it may allow copying the travel itinerary.

In step 203, the system associates the role and/or sub-role selected by the user with the contact, such that the contact's access to the content will be according to the pre-defined rules and/or sub-rules associated with the role and/or sub-role associated with the contact. In addition to rules and/or sub-rules pre-associated with a role (e.g., by the system, system developer, a user in a supervisory role and/or user), the user may further have the option to assign additional rules and/or sub-rules to a specific contact, where the user wishes to further customize the specific contact's access to the content. The additional rules and/or sub-rules may be manually inputted by the user, and/or may be selectable by the user from a menu (e.g., a drop down menu) showing a set of additional rules and/or sub-rules that can be used to modify and/or customize the rules and/or sub-rules associated with role assigned to the contact. In one example, the additional rules and/or sub-rules available to the user may be customized based on the role selected by the user in step 202.

In step 203, the system determines if the user has selected and/or inputted additional rules and/or sub-rules with respect to the user. If in step 203, the system determines that the user has inputted and/or selected additional rules and/or sub-rules, the process continues to step 204. In step 204, the system associates the additional rules and/or sub-rules with the contact. In step 205, the system shares the content with the selected contact. For example, the system provides a notification to the contact, for example, providing a link to the content (e.g., as an email message or social networking post, notifying the contact that the user has shared the content with the contact). Similarly, if in step 203, the system determines that the user has not selected and/or inputted additional rules and/or sub-rules with respect to the user, the system continues to step 205.

Figure 3:
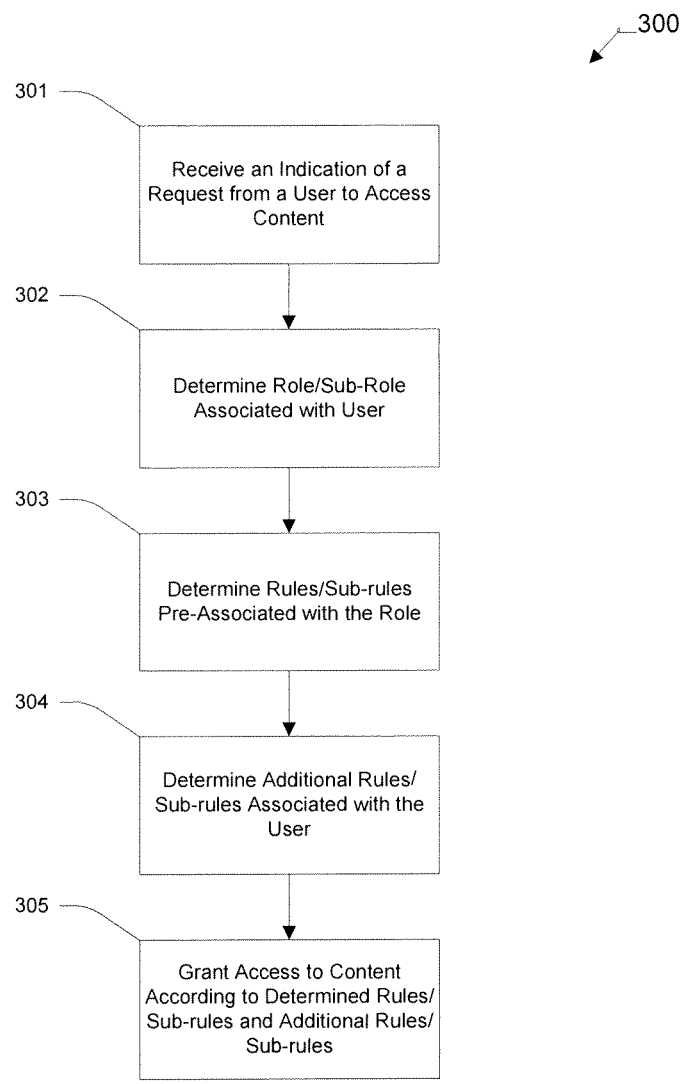
FIG. 3 illustrates a flow diagram of an example process for granting access to content according to role-based information sharing levels.

FIG. 3 illustrates a flow diagram of an example process 300 for granting access to content according to role-based information sharing levels. In step 301, the system receives an indication of a request from a user (e.g., a contact with whom a user has shared content) to access content. In step 302, the system determines a role and/or sub-role associated with the user. In step 303, the system determines the rules and/or sub-rules pre-associated with the determined role and/or sub-role. Each role and/or sub-role may be pre-defined and may include a set of rules and/or sub-rules which define which categories or segments of the content may be shared with contacts assigned to that role and/or sub-role. Rules typically define which portions of the content (e.g., category, segment and/or type of content of the entire collection of content) are accessible by contacts belonging to a specific role. Sub-rules may indicate restrictions on access such content, with respect to the accessible portions, including for example, access rights with respect to the content as well as context restrictions. Access rights may for example allow a user to view the content and/or to edit the content. Context restrictions may place restrictions on the time and/or dates that the user is granted access to each specific category of content, furthermore they may be a restrictions on which devices the user can access the content through, furthermore, the user location (e.g., geographical location) may be restricted, such that the user is only given access to the content within specific zones or geographical locations.

Next, in step 304, the system determines any additional rules and/or sub-rules associated with the user. In step 305, the system grants access to the content according to the determined rules and sub-rules including those associated with the role and/or sub-roles associated with the contact as determined in step 302, and/or any additional rules and/or sub-rules associated with the user specifically.

Figure 4:
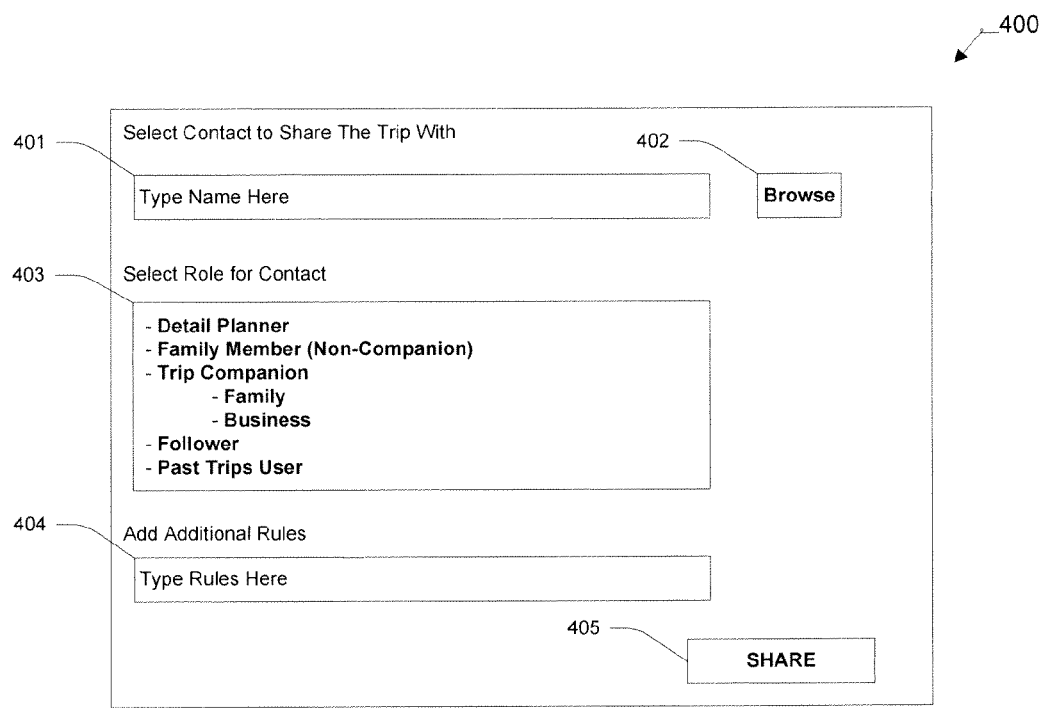
FIG. 4 illustrates a screen shot of an example graphical user interface for allowing a user to sharing trip information content with one or more contacts according to role-based sharing levels.

FIG. 4 illustrates a screen shot of an example graphical user interface 400 for allowing a user to sharing trip information content with one or more contacts according to role-based sharing levels. As illustrated, the graphical user interface may include a contact entry field 401, where the user may enter a name of a contact. In one example, the user may be logged into one or more social networking services, email services and/or the system may have access to one or more address books associated with the user. The system may perform auto complete, using the contacts of the user at the various services and/or address books when the user begins typing in the name of the contact. Alternatively, the user may browse the listing of his contacts using the browse button 402. The graphical user interface 400 further includes a role selection menu 403, which allows the user to select a role and/or sub-role to assign to the contact. In one example, only one role and an associated sub-role may be selectable by a user, while in another example, the user may be able to select one or more roles or sub-roles. The graphical user interface 400 may additionally include an additional rule entry field and/or menu 404, allowing the user to assign additional rules/sub-rules to further customize the access rights of the contact. In one example, the additional rules/sub-rules entry field may be replaced with a selection area or may provide auto-fill options, for example based on the selection of a role and/or sub-role. In one example, upon completing the necessary fields, the user may then submit the request to share the content using the share button 405.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
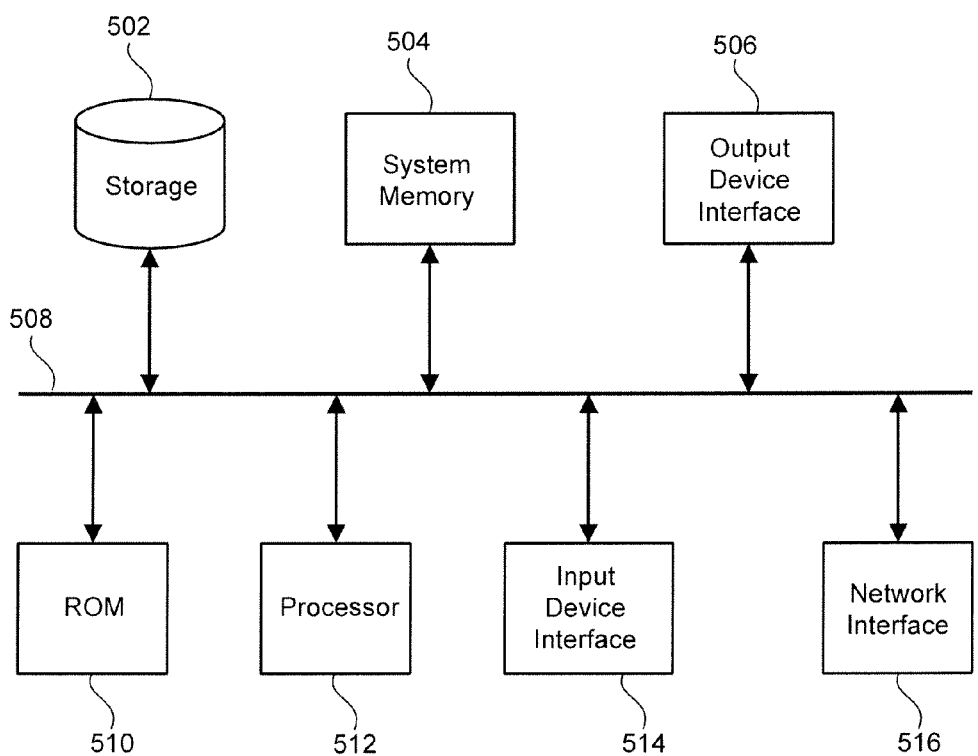
FIG. 5 conceptually illustrates an electronic system with which some implementations of the subject technology are implemented.

FIG. 5 conceptually illustrates an electronic system with which some implementations of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for managing multi-media messages according to various implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

What is claimed is:

1. A machine-implemented method comprising:
   identifying a first content associated with a first user, the first content belonging to a specific content space, wherein the first content is divided into two or more segments, each segment being categorized into at least one category of two or more system-defined content categories;
   receiving a request from the first user to share the first content with a second user;
   providing a plurality of system-defined roles associated with the content space to the first user for selection, each role being pre-associated with one or more rules defining which of the two or more content categories are accessible by a user assigned to the role;
   receiving a selection by the first user of a role of the plurality of system-defined roles provided to the first user to assign to the second user;
   assigning the role to the second user for the first content in response to receiving the selection, wherein the second user is assigned one or more different roles of the plurality of system-defined roles for different content belonging to the content space; and
   providing the second user with access to the first content according to the one or more pre-associated rules associated with the role assigned to the second user, wherein the second user is provided with access to one or more segments of the first content according to the role assigned to the second user for the first content.

2. The method of claim 1, wherein the content includes trip information regarding a trip.

3. The method of claim 2, wherein the two or more categories include an infrastructural trip information category, an experience trip information category and a location information category.

4. The method of claim 2, wherein the plurality of system-defined roles include detailed planner, family member, trip companion, follower and past trips user.

5. The method of claim 2, wherein the two or more categories comprise trip-related categories.

6. The method of claim 1, wherein users assigned to each of the plurality of system-defined roles have different access to a different segment of the content than users assigned to at least another one of the plurality of system-defined roles and at least one of the plurality of system-defined roles is defined based at least in part on a heuristic associated with the specific content space.

7. The method of claim 1, wherein the one or more rules are system-defined and are automatically applied to the access rights of a user associated with the role with respect to the content.

8. The method of claim 1, wherein at least one of the one or more pre-associated rules is further associated with one or more sub-rules, a sub-rule defining one or both of access rights and context limitations with respect to content within the content space.

9. The method of claim 8, wherein the access rights define whether the user has one or more both of rights to view content that the user has access to according to the rule or edit content.

10. The method of claim 8, wherein the context limitations define one or more of a time of day, a date range, a location or a device where the user can access content.

11. The method of claim 1, further comprising:
determining whether the first user has entered one or more user-defined rules, the additional rules not being pre-associated with the role; and
associating the user-defined rules with the second user, wherein the user-defined rules provide further limitations on the access rights of the second user according to the one or more pre-associated rules.

12. The method of claim 1, further comprising:
receiving an indication of a request from the second user to access the content;
determining the role assigned to the second user in response to receiving the indication;
determining one or more system-defined rules associated with the role; and
providing the second user with access to the content according to the determined one or more system-defined rules.

13. The method of claim 12, further comprising:
determining one or more user-defined rules associated with the second user, wherein the providing the second user with access is further based on the one or more additional user-defined rules.

14. The method of claim 1, wherein the categorization of the content within the content space is based on one or more of the characteristics of content within the content space and historical information regarding content belonging to the content space.

15. The method of claim 1, wherein the one or more rules for each of the plurality of system-defined roles are defined according to one or more of the type of relationship defined by the role, the characteristics of content within the content space and historical information regarding the content belonging to the content space.

16. A system comprising:
one or more processors; and
a non-transitory machine-readable medium comprising instructions stored therein, which when executed by the processors, cause the processors to perform operations comprising:
identifying a first content associated with a first user, the first content belonging to a specific content space, wherein the first content is divided into two or more segments, each segment being categorized into at least one category of two or more system-defined content categories based at least in part on a heuristic associated with the specific content space;
receiving a request from the first user to share the first content associated with the first user with a second user, the request including a selection by the first user of a role of a plurality of system-defined roles associated with the content space to assign to the second user;
assigning the selected role to the second user in response to receiving the selection, the selected role being associated with one or more rules pre-associated with the role by the system, wherein the one or more rules define whether content under each of the two or more categories is shared with users assigned to the role and the second user is assigned one or more different roles of the plurality of system-defined roles for different content belonging to the content space; and
sharing the first content with the second user according to the one or more rules pre-associated with the selected role assigned to the second user, wherein the second user is provided with access to one or more segments of the first content according to the selected role assigned to the second user for the first content.

17. The system of claim 16, the operations further comprising:
receiving a selection of one or more additional user-defined rules by the first user, the additional user-defined rules defining further limitations on the access rights of the second user; and
associating the additional user-defined rules with the second user, such that the access of the second user to the first content is further limited based on the one or more additional user-defined rules.

18. The system of claim 16, wherein the second user is associated with one or more different roles of the plurality of system-defined roles for different content belonging to the content space.

19. The system of claim 16, wherein the categorization of the content within the content space is based on one or more of the characteristics of content within the content space and historical information regarding content belonging to the content space.

20. The system of claim 16, wherein the one or more rules for each of the plurality system-defined of roles are defined according to one or both of the type of relationship defined by the role, the characteristics of content within the content space and historical information regarding the content belonging to the content space.

21. A non-transitory machine-readable medium comprising instructions stored therein, which when executed by a machine, cause the machine to perform operations comprising:
identifying a first content associated with a first user, the first content belonging to a specific content space, wherein the first content is divided into two or more segments, each segment being categorized into at least one category of two or more system-defined content categories;

receiving a request from the first user to share the first content with a second user;

receiving a selection by the first user of a role of a plurality of system-defined roles associated with the content space to assign to the second user, each of the plurality of system-defined roles being pre-associated with one or more rules, wherein the one or more rules define which of the two or more content categories are accessible by users assigned to the role;

assigning the role to the second user in response to receiving the selection; and providing the second user with access to the first content, wherein the second user is granted access to the first content according to the one or more rules associated with the role assigned to the second user, wherein the second user is provided with access to one or more segments of the first content according to the role assigned to the second user for the first content.

* * * * *